(12) United States Patent
Narayan et al.

(10) Patent No.: US 7,553,919 B2
(45) Date of Patent: Jun. 30, 2009

(54) STARCH-VEGETABLE OIL GRAFT COPOLYMERS AND THEIR BIOFIBER COMPOSITES, AND A PROCESS FOR THEIR MANUFACTURE

(75) Inventors: Ramani Narayan, Okemos, MI (US); Sunder Balakrishnan, Okemos, MI (US); Boo-Young Shin, Kyoungsan (KR)

(73) Assignee: Board of Trustees of Michigan State University, East Lansing, MI (US)

( * ) Notice: Subject to any disclaimer, the term of this patent is extended or adjusted under 35 U.S.C. 154(b) by 610 days.

(21) Appl. No.: 11/124,491

(22) Filed: May 6, 2005

(65) Prior Publication Data
US 2006/0252901 A1 Nov. 9, 2006

(51) Int. Cl.
| C08F 251/00 | (2006.01) |
| C08L 3/00 | (2006.01) |
| C08L 89/00 | (2006.01) |
| D21H 19/54 | (2006.01) |
| C08B 31/12 | (2006.01) |
| A61K 9/28 | (2006.01) |

(52) U.S. Cl. .................... 527/300; 524/47; 524/50; 524/51

(58) Field of Classification Search .............. 527/300; 524/47, 50, 51
See application file for complete search history.

(56) References Cited

U.S. PATENT DOCUMENTS

| 2,146,671 | A | * | 2/1939 | Ellis ...................... 528/295.3 |
| 4,119,640 | A | * | 10/1978 | Hodakowski et al. ........ 549/546 |
| 4,382,136 | A | * | 5/1983 | Blount ...................... 527/305 |
| 4,663,163 | A | * | 5/1987 | Hou et al. ................... 210/645 |
| 4,673,707 | A | * | 6/1987 | Tsai et al. ................... 525/54.2 |
| 5,128,461 | A | * | 7/1992 | Best et al. ................... 536/111 |
| 5,130,394 | A | * | 7/1992 | Nguyen et al. .............. 527/300 |
| 5,280,055 | A | * | 1/1994 | Tomka ......................... 524/47 |
| 5,346,936 | A | * | 9/1994 | Buehler et al. ............... 524/47 |
| 5,367,067 | A | * | 11/1994 | Frische et al. ................ 536/45 |
| 5,432,000 | A | * | 7/1995 | Young et al. ................ 428/372 |
| 5,616,671 | A | * | 4/1997 | Narayan et al. ............. 527/300 |
| 5,654,353 | A | | 8/1997 | Li et al. |
| 5,691,403 | A | * | 11/1997 | Shitaohzono et al. ......... 524/47 |
| 5,728,824 | A | * | 3/1998 | Narayan et al. ............. 536/107 |
| 5,780,568 | A | * | 7/1998 | Vuorenpaa et al. .......... 527/300 |
| 5,801,224 | A | * | 9/1998 | Narayan et al. ............. 528/357 |

(Continued)

OTHER PUBLICATIONS

Fang, J.M. et al, "An investigation of the use of recovered vegetable oil for the preparation of starch thermoplastics", Carbohydrate Polymers, Applied Science Publishers, Ltd., Barking, GB, vol. 50, No. 4, Dec. 1, 2002, pp. 429-434, XP004378751, ISSN: 0144-8617.

(Continued)

*Primary Examiner*—Mark Eashoo
*Assistant Examiner*—Liam J Heincer
(74) *Attorney, Agent, or Firm*—Ian C. McLeod

(57) ABSTRACT

A new starch-vegetable oil graft copolymer, wherein the vegetable oil has been reacted onto the starch backbone using thermal or free radical initiators has been produced in a twin-screw co-rotating extruder. The starch-vegetable oil graft copolymer can further be reinforced with biofiber in the presence of an optional modifier such as maleic anhydride by reactive extrusion processing to form composites suitable to be injection molded into biodegradable articles.

50 Claims, 9 Drawing Sheets

U.S. PATENT DOCUMENTS

| | | | |
|---|---|---|---|
| 6,011,092 A * | 1/2000 | Seppala et al. | 524/47 |
| 6,121,398 A * | 9/2000 | Wool et al. | 526/238.1 |
| 6,211,315 B1 * | 4/2001 | Larock et al. | 526/238.3 |
| 7,067,651 B2 * | 6/2006 | Poovarodom et al. | 536/124 |
| 7,071,249 B2 * | 7/2006 | Ho et al. | 524/39 |
| 2002/0155080 A1 * | 10/2002 | Glenn et al. | 424/70.5 |
| 2004/0068073 A1 * | 4/2004 | Doane et al. | 527/300 |
| 2005/0029703 A1 * | 2/2005 | Franke et al. | 264/151 |
| 2005/0171249 A1 * | 8/2005 | Wang et al. | 524/47 |
| 2006/0020062 A1 * | 1/2006 | Bloom | 524/114 |
| 2006/0111511 A1 * | 5/2006 | Narayan et al. | 525/54.2 |
| 2006/0216489 A1 * | 9/2006 | Shooshtari et al. | 428/292.1 |
| 2007/0275258 A1 * | 11/2007 | Ohnishi et al. | 428/532 |
| 2007/0287777 A1 * | 12/2007 | Kawamura et al. | 524/47 |

OTHER PUBLICATIONS

Sagar A.D. et al, "Properties of Fatty-acid Esters of Starch", Journal of Applied Polymer Science, John Wiley and Sons Inc., New York, US, vol. 58, No. 9, Nov. 28, 1995, pp. 1647-1656, XP000537861, ISSN: 0021-8995.

Aburto, J. et al: "Synthesis characterization, and biodegradability of fatty-acid esters of amylose and starch", J. Appl. Polym. Sci., 1999, John Wiley & Sons Inc, New York, NY, USA, vol. 74, No. 6, 1999, pp. 1440-1451, XP002396361.

* cited by examiner

Screw Configuration used in the synthesis of starch-vegetable oil graft copolymers by reactive extrusion processing.

STARCH-VEGETABLE OIL GRAFT COPOLYMERS AND THEIR BIOFIBER COMPOSITES, AND A PROCESS FOR THEIR MANUFACTURE

CROSS-REFERENCE TO RELATED APPLICATIONS

Not Applicable

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

This invention relates to the preparation of thermoplastic starch-vegetable oil graft copolymers and moldable compositions containing a biofiber reinforced in the starch-vegetable oil graft copolymer matrix, which are preferably biodegradable. More specifically, the present invention relates to a process of making biofiber reinforced starch-vegetable oil graft copolymer blends which can be injection molded to give products which are totally biodegradable, easily processed and possessing good mechanical properties.

(2) Description of Related Art

Traditionally, plastics have been formulated to result in strong, light-weight, durable, and bioresistant polymeric materials. It is the durability and indestructibility that makes plastic the material of choice for many applications. However, these same properties are problems when the plastics enter the waste stream. The recent trend is to create biodegradable plastics, most of such plastics being first commercialized in the mid 1980's (Barenberg, S. A., et al., "Degradable Materials: Perspectives, Issues and opportunities" (1990: and Vert, M., et al., "Biodegradable Polymers and Plastics" (1992)).

Among the first 'biodegradable' plastics made were blends of non-biodegradable polyolefins with starch which were at best only partially biodegradable (Gilmore, D. F., et al., "The Fate of 'Biodegradable' Plastics in municipal Leaf Compost", J. Industr. Microbiol. 10, 199-206 (1992); Barak, Y., et al., J. Environ. Qual., 20 173 (1991); Krupp, L. R., et al., Environ. Sci. Techol. 26 193 (1992); and Swanson, C. L., et al., J. Environm. Polymer Degrad. 1(2), 155-165 (1993). These plastics are not compatible with waste management infrastructures, such as composting. Moreover, at that time, the appropriate infrastructures capable of dealing with biodegradables did not exist. Instead of composting, these products generally ended up in sanitary landfills.

Landfills, in general, are a poor choice as a repository of plastic and organic waste. Landfills are plastic-lined tombs designed to retard biodegradation by providing little or no moisture with negligible microbial activity. Organic waste, such as lawn and yard waste, paper, and food waste should not be entombed in such landfills to be preserved for posterity. Accordingly, there is a growing trend to divert these materials into composting facilities, which allow them to be biodegraded to produce humus or compost. This compost can then be used as a valuable soil additive for new plant growth.

When plastics are designed to be biodegradable, utilizing renewable resources as the major raw material component, the plastics can become part of an ecologically sound solution.

Biodegradation of natural materials produces valuable compost as the major product, in addition to water and carbon dioxide. Such carbon dioxide is fixed or neutral and therefore does not contribute to an increase in the greenhouse gases.

U.S. Pat. No. 5,095,054 to Lay et al (1992) discloses the use of water as a plasticizer for starch (referred to as starch "destructurization") in order to make the material processable in for example an extruder. Products derived therefrom tend to have the problem of rapidly losing water to the environment by evaporation. As a result, this type of material tends to become brittle with age. These materials are also highly water sensitive which is undesirable in the majority of applications of thermoplastic products. To address this issue of water sensitivity, the patent also includes various blends of destructured starch with a variety of synthetic petroleum-based plastics. Such blend compositions, along with earlier starch-filled polyolefins, are at best only biodisintegrable and not fully biodegradable. Starch-polyolefin compositions have been reported by the Fertec group (PCT Int. Pat. Appl. WO 92/14782, Bastioli, et al. "Biodegradable Compositions Based on Starch and Thermoplastic Polymers", Novamont S. P. A., (1992); PCT Int. Pat Appl. WO 91/02025, C. Bastioli, et al., "A Polymer Composition including Destructured Starch and an Ethylene Copolymer", Novamont S. P. A. (1991) (See also WO 91/02023 and WO 91/02024)).

U.S. Pat. No. 4,873,270 to Aime et al., (1989), describes blends of polyurethane with for example poly(vinylchloride) and a carbohydrate such as potato flour. U.S. Pat. Nos. 3,850, 862 and 3,850,863 to Clendinning et al (1974), disclose blends of a naturally biodegradable product, such as tree bark, protein, starch, peat moss, saw dust, etc., with a dialkanoyl polymer (U.S. Pat. No. 3,850,862) such as poly(alkylene adipate), or with an oxyalkanoyl polymer (U.S. Pat. No. 3,850,863), such as poly(caprolactone). U.S. Pat. No. 4,863, 655 to Lacourse et al (1989) discloses water-soluble high amylose starch containing poly(vinyl alcohol). This type of modified starch is highly hydrophilic and water soluble; the starch contains about 5% by weight propylene oxide corresponding to a theoretical degree of substitution of 0.19. This is a very low degree of substitution compared with the maximum degree of substitution for starch which is 3.0 according to the three available hydroxyl groups on the anhydroglucose repeat unit. The poly(vinyl alcohol) typically used as a blend component further adds to the water-sensitive nature of these materials.

As discussed earlier, prior art blend compositions are at best biodisintegrable and not fully biodegradable. In composting, the non-biodegradable components will be persistent resulting in an irreversible build-up of these components in the environment causing reduced productivity and fertility of the soil. Even if such 'biodegradable' blend compositions are partially biodegradable, the resulting compost will have very little value. In fact, these recalcitrant components will be present in the final compost at significantly higher concentration levels than in the original waste mixture.

Graft copolymerization of a vinyl monomer on the starch backbone was used to modify starch. Fanta and Bagley (Fanta, G. F., et al., Encyclopedia of Polymer Science, John Wiley & Sons; New York (1970: and Fanta, G. F., Block and Graft Copolymers—Vol. 1, John Wiley & Sons; New York (1973) have reviewed the synthesis and discussed some applications of starch graft copolymers. Otey et al (Otey, F. H., et al., Industrial Engineering Chemistry Products Research Development, 19, 592 (1980); Otey, F. H., et al., Industrial Engineering Chemistry Products Research Development, 23, 284 (1984); and Otey, R. P., et al., Industrial Engineering Chemistry Products Research Development, 26, 1659 (1987)) blended starch with poly(ethylene-co-acrylic acid) (EAA). In these papers, the authors suggested the formation of hydrogen bonds between the carboxylic group in EAA and the hydroxyl group in starch. Increasing the level of starch decreased the percentage elongation of the film and increased the diffusion rate of water. Similar complexes like EAA can also be formed with the hydroxyl groups of the polyethylene-vinyl alcohol (EVOH) copolymer. Bloembergen et al have reported on blends and alloys containing lignocelluloses like starch, cellulose acetate etc. U.S. Pat. No. 5,314,934 to Tomka et al provides a process to produce a polymer mixture essentially consisting of thermoplastically processable starch (up to 70-wt %). During this mixture process, an esterification reaction takes place between the maleic anhydride groups in the terpolymer with free hydroxyl groups in the starch. These reactive blends can be blown into film with properties comparable to LDPE. U.S. Pat. No. 5,234,977 to Bastioli et al discloses a material used for the product of biodegradable articles in film, sheet or fiber form, which can be produced by extrusion from a molten mass that includes a synthetic thermoplastic polymer and a destructured starch to which a boron containing compound such as boric acid has been added.

U.S. Pat. Nos. 5,618,341, 5,679,145, 5,858,824, 6,168,857 and 6,231,970 to Andersen et al explain thermoplastic starch compositions that include a particulate filler and an optional fiber. These compositions may be shaped into a wide variety of useful articles, such as sheets, films, containers and packaging materials. The overall composition in this case is typically more environmentally friendly compared to conventional thermoplastic materials.

U.S. Pat. No. 5,928,737 to Hammer et al discloses thermoplastic starch compositions formed by heating granular starch with an additive and further reinforced with fiber and protein to form sausage casings.

U.S. Pat. No. 6,521,147 to Arentsen et al provides a method and apparatus for manufacturing fiber-reinforced foamed paper-like products. Further, U.S. Pat. No. 6,565,640 to Bengs et al provides compositions based on starch and/or modified starch and comprising plasticizers which can be processed thermoplastically to give shaped articles which are biodegradable and physiologically non-hazardous. These articles may be used as packaging or casing for food or drink or pharmaceutical products, or also for the controlled release of active substances, or else for producing temporary protective coatings.

More recently, U.S. Pat. No. 6,709,526 to Bailey et al provides compositions containing starch, a polymer that is substantially compatible with starch and has a weight-average molecular weight of at least 500,000 g/mol such that the polymer forms effective entanglements or associations with neighboring starch molecules, and preferable at least one additive to improve melt flow and melt processability. The composition is especially suitable for uniaxial and biaxial extensional processes to make fibers, films, foams and like products.

The prior art on biodegradable materials and blends is restricted to starch-based materials in which the starch component is hydrophilic (water sensitive). No prior art exists on blends containing starch oil graft copolymer products and their biofiber reinforced composites as fully biodegradable products which are readily processable on conventional plastics processing equipment such as extruders injection molders, etc.

Objects

It is an object of the present invention to achieve good processability and mechanical properties with a novel starch graft co-polymer product. It is further an object to provide such processable products which are also biodegradable. It is also an object to provide new starch-based materials which utilize agricultural resources and return those resources to nature in an environmentally sound manner. These and other objects will become increasingly apparent by reference to the following description. The substance and advantages of the present invention will become increasingly apparent by reference to the following description and the drawings.

SUMMARY OF THE INVENTION

The present invention provides new biobased polymeric materials which are sustainable and environmentally responsible. The present invention describes a method of preparing a blend system which is compatibilized and contains fully biodegradable components for making moldable products. The compatibilized blend system has been designed and engineered by blending biodegradable, starch-vegetable oil graft copolymers with biofibers and optionally biodegradable aliphatic and aliphatic-aromatic copolymers of polyesters. Examples of biodegradable polyesters include poly(caprolactone) (PCL), poly(vinylacetate-co-vinylalcohol)(PVAc/VA), poly(lactic acid) or polylactide (PLA), poly(glycolic acid) or polyglycolide (PGA), and related like polybutylene adipate coterphthalate (PBAT), copolyesters including the various combinations of stereoisomers, bacterial and synthetic poly(beta-hydroxybutyrate)(PHB), Poly(beta-hydroxybutyrate-co-beta-hydroxyvalerate(PHB/V), and other poly(beta-hydroxyalkanotes) (PHA).

The present invention provides a preferred method for obtaining starch-vegetable oil graft copolymer formed by reacting starch with a vegetable oil in the presence of a plasticizer using free-radical initiator and further reinforcing it with a fiber and optionally biodegradable polyester. The plasticizer is selected from the group including a variety of biodegradable esters miscible with the starch ester and polyester. These products are readily processable, and have good mechanical properties. Most importantly, the polymers are fully biodegradable and after their end-use can be composted to produce valuable soil amendment.

The present invention relates to a biodegradable starch-vegetable oil graft copolymer composition which is a reactively blended mixture comprising a granular starch, a vegetable oil or a derivative thereof comprising a modifier reactive with the starch, and a plasticizer. The present invention relates to the composition wherein the granular starch is selected from the group consisting of cornstarch, potato starch, tapioca starch, rice starch, wheat starch, cassava starch and high amylase cornstarch. Preferably the starch in the mixture is 5% to 90% by weight. Preferably the starch has a moisture content of about 0.5% to 15% by weight of the starch. Preferably the starch is in a pulverized form. Preferably the starch is chemically modified with the modifier. Generally the vegetable oil is unsaturated and is selected from the group consisting of fatty acids and esters. The derivatives of vegetable oil are generally reactive in the composition. Epoxylated, maleated and hydroxylated vegetable oils are the most preferred. Preferably the vegetable oil is selected from the group consisting of corn oil, soybean oil, maleated soybean oil and epoxidized soybean oil and mixtures thereof. Preferably the vegetable oil is 1% to 10% by weight of the composition. Preferably the plasticizer is a polyhydric alcohol in an amount between 10 to 40 wt-% of the total of the composition. Preferably a free-radical peroxide initiator is provided in the mixture, and wherein the free-radical initiator is 2,5-Bis(tert-butylperoxy)-2,5-dimethylhexane (LUPEROX 101). Preferably a free radical peroxide initiator is provided in the mixture in an amount between about 0.01 to 3-wt % of the total weight of the composition. Preferably the composition comprises a fiber, and wherein the fiber is selected from the group consisting of cotton, wood, flax, abaca, sisal, ramie, hemp, and bagasse. Preferably the fiber has an aspect ratio of at least about 10:1. Preferably the fiber is present in an amount between about 3% to 80% by weight of the composition. Preferably the composition comprising the modifier which is selected from the group consisting of cyclic or dibasic acid and anhydrides thereof. Preferably the modifier is present in the composition in amount of about 0.1 to about 10% by weight of the starch. Preferably the composition comprises a biodegradable polyester selected from the group consisting of poly(caprolactone) (PCL), poly(vinylacetate-co-vinylalcohol) (PVAc/VA), poly(lactic acid) or polylactide (PLA), poly(glycolic acid) or polyglycolide (PGA), poly(beta-hydroxyalkanoates) (PHA), and aliphatic aromatic copolyesters, like polybutylene adipate coterphthalate (PBAT). Preferably the biodegradable polyester is 1% to 60% by weight of the composition.

The present invention further relates to a process for producing a biodegradable starch vegetable oil copolymer composition which comprises: reactively blending a mixture of a granular starch, a vegetable oil or a derivative thereof comprising a modifier reactive with the starch, and a plasticizer in a reactor; and removing the composition from the reactor to produce the composition.

Preferably the reactor is an extruder. Preferably the vegetable oil derivative is a maleated vegetable oil. Preferably the mixture further comprises a filler. Preferably the filler is a natural fiber. Preferably the plasticizer is a solvent for the mixture.

DESCRIPTION OF PREFERRED EMBODIMENTS

Figure 1:
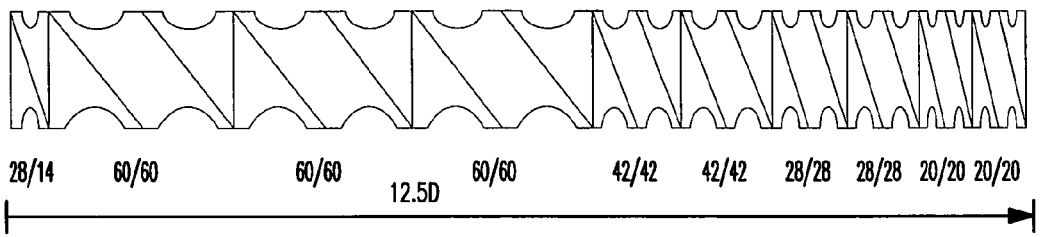
FIG. 1 illustrates the screw configuration used in the synthesis of starch-vegetable oil graft copolymers by reactive extrusion processing. The screw of length 12.5 D is followed by the screw of length 15.5 D and then finally by the screw of length 12 D. D is 30 mm.
Figure 1:
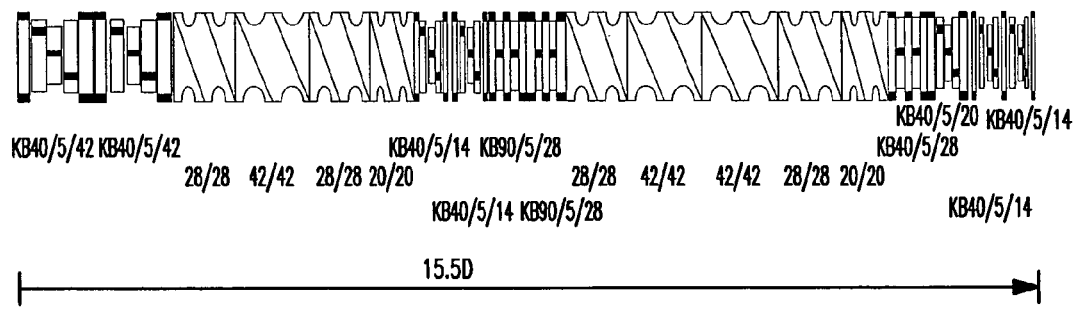
Figure 1:
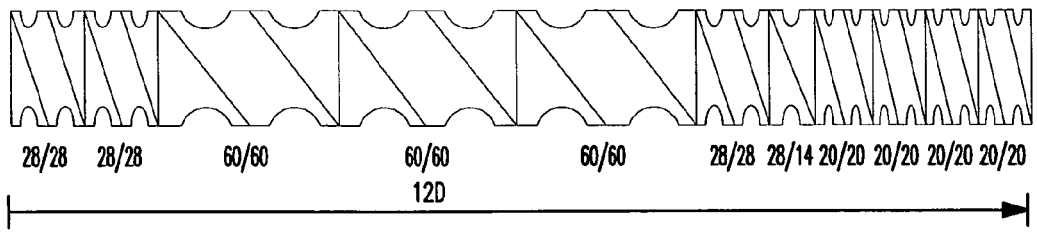

The present invention provides a biodegradable moldable product wherein, generally, the product is prepared by introducing a reinforcing fiber and an optionally biodegradable polyester into a starch-vegetable oil graft copolymer matrix. Further, the starch-vegetable oil graft copolymer can be prepared by reactive-extrusion processing of starch, vegetable oil, plasticizer and a free-radical initiator.

The degree of substitution (DS) of a polymer is the (average) number of substituent groups attached per base unit (in the case of condensation polymers) or per monomeric unit (in the case of additional polymers). The term has been used mainly in cellulose chemistry where each anhydroglucose unit has three reactive (hydroxyl) groups. Degree of substitution can then range from zero (cellulose itself) to three (fully substituted cellulose). The same chemistry applies herein to starch wherein each glucose moiety has three reactive hydroxyl sites.

Starch $(C_6H_{10}O_5)_n$ is a mixture of linear (amylose) and branched (amylopectin) polymers. Amylose is essentially a linear polymer of $\alpha(1\rightarrow 4)$ linked D-glucopyranosyl units. Amylopectin is a highly-branched polymer of D-glucopyranosyl units containing $\alpha(1\rightarrow 4)$ linkages, with $\alpha(1\rightarrow 6)$ linkages at the branch points. The granular starch was obtained from Corn Products, Inc. (Illinois) from the country of Brazil. Various other starches, such as potato starch, tapioca starch, rice starch, wheat starch, cassava starch, and other starches familiar to those skilled in the art can be utilized in accordance with the present invention. Compositions having increased levels of linear starch polymers are most likely to be the correct choice in terms of processability, molding and mechanical properties.

The starch-vegetable oil graft copolymer compositions of the present invention comprises what is considered in the art to be a specialty starch, preferably having an amylose content greater than 50% and most preferably greater than 70%. The degree of substitution preferably ranges from 0.001 to 1 DS and more preferably from 0.01 to 0.05 DS.

Modified starches are particularly useful in this invention. By chemically modified, it is meant that the starch can be derivatized or modified by typical processes known in the art, e.g. esterification, etherification, oxidation, acid hydrolysis, crosslinking and enzyme conversion. Typically, modified starches include esters, such as the acetate and half-esters of dicarboxylic acids, particularly the alkylsuccinic acids; ethers, such as the hydroxyethyl and hydroxypropyl starches and cationic starches such as starch modified with 2-diethylaminoethyl chloride (DEC) and starch modified with quaternary ammonium reagents such as 3-chloro-2-hydroxypropyltrimethylammonium chloride; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, Edited by Roy L. Whistler, et al., Chapter X; Starch Derivations: Production and Uses by M. W. Rutenberg, et al., Academic Press, Inc., (1984). The starch component in the blend is 5% to 90% by weight, preferably from 50% to 80% by weight.

The aforementioned starches and starch esters can be made into a wide range of starch-vegetable oil graft copolymers using a wide variety of oils. The oils pertaining to this invention are unsaturated fatty acids (triglycerides) obtained from plant based resources. The preferred oils are corn, soybean and mixtures thereof and their maleated and epoxidized versions. The concentration of the oils in the starch-vegetable oil graft copolymers is 1% to 10% by weight, preferably between 2% to 5% by weight.

A plasticizer which is a polyhydric alcohol, which is well known to those skilled in the art, can be added to the composition to achieve grater material processability and product flexibility. An obvious requirement of these plasticizers is that they are biodegradable. Optional plasticizers are well known in the art. Typical plasticizers are water, dihydric, trihydric, polyhydric alcohols, and their derivatives. Some examples are ethylene glycol, propylene glycol, glycerol, glycerol esters, erythritol, pentaerythritol, sorbitol, and higher molecular weight plasticizers like poly glycerol and poly glycerol esters. Glycerol esters include glycerol monoacetate, diacetate, and triacetate. For the purpose of this invention, it is preferred that the plasticizers chosen have a boiling point sufficiently higher than the processing temperature in the extruder and be thermally stable. The preferred plasticizers are glycerol, glycerol esters, sorbitol, and mixture thereof. It is preferred that the amount of the plasticizer be in the range of 1 to 30% by weight of the total reactant mixture, preferably 15 to 30% by weight.

The free-radical initiator used in this invention was obtained from Aldrich Chemical (Wisconsin) and is 2,5-Bis (tert-butylperoxy)-2,5-dimethylhexane (LUPEROX 101; Aldrich, Wisconsin)). Numerous other free radical initiators are known to those skilled in the art. The radical initiator is preferably added in an amount ranging between 0.01 to 10-wt % of the total weight.

It is highly desirable that these starch-vegetable oil graft copolymers be capable of forming biodegradable products with good mechanical properties which can be easily processed in conventional equipments like extruder and injection molder.

These starch-vegetable oil graft copolymers are useful as matrices which can preferably be reinforced with fiber, modifiers and optional biodegradable polyester to form blends suitable to be injection molded.

Preferred fibers include cotton, wood fibers (both hardwood or softwood fibers, examples of which include southern hardwood and southern pine), flax, abaca, sisal, ramie, hemp and bagasse because they readily decompose under normal conditions. The fibers have an aspect ratio of at least about 10:1, preferably greater than about 25:1, more preferably greater than about 100:1, and most preferably greater than about 250:1.

A wide range of fibers can optionally be used in order to improve the physical properties of the thermoplastic starch compositions of the present invention. As used in the specification and the appended claims, the terms fibers" and "fibrous material" include both inorganic and organic fibers. Fibers may be added to the moldable mixture to increase the toughness, and fracture energy, as well as the flexural and tensile strengths of the resulting sheets and articles. Fibrous materials reduce the likelihood that the sheets, films or articles made from thermoplastic starch compositions will shatter when cross-sectional forces are applied. Accordingly, the concentration of fibers within the thermoplastic starch compositions of the present invention can be included in a broad range from 1% to about 60% by weight of the thermoplastic starch composition. Preferably, fibers will be included in an amount in a range from about 10% to about 30% by weight of the thermoplastic starch composition.

Reactive modifiers for the composition preferably are selected from the class of cyclic dibasic acid anhydrides such as maleic, succinic, itaconic, phthalic and combinations thereof. Other modifiers include phthalic acid derivatives like diethyl phthalate, dimethyl phthalate, and dioctyl phthalate, phosphoric acid derivatives like triethyl phosphate, tributyl phosphate, and trioctyl phosphate, glycerol, and glycerol esters, and sulfonic acid derivatives. The modifier is preferably present in amount of about 1% to about 10% by weight of the starch based reactant whereby to provide an acidic environment for the mixture.

Examples of biodegradable polyesters include poly(caprolactone)(PCL), poly(vinylacetate-co-vinylalcohol) (PVAc/VA), poly(lactic acid) or polylactide (PLA), poly(glycolic acid) or polyglycolide (PGA), and related copolyesters including the various combinations of stereoisomers, bacterial and synthetic poly(-hydroxybutyrate) poly(beta-hydroxybutyrate-co-beta-hydroxyvalerate) (PHB/V), and other poly(beta-hydroxyalkanoates)(PHA), and biodegradable aliphatic-aromatic copolyesters. The biodegradable polyester is incorporated in the final blend in an amount ranging from 0% to 60% by weight and preferably from 10% to 30% by weight.

The products of the present invention possess significant mechanical properties while still retaining their biodegradability. This is further achieved by engineering the appropriate degree of substitution and molecular weight of the starch-vegetable oil graft copolymers component, by blend composition, choice of polyester, modifier and fiber.

The present invention can be processed by various methods known in the art, such as extrusion pelletizing and injection molding. For example, the biodegradable fiber reinforced starch-vegetable oil graft copolymers made in accordance with the present invention can be injection molded to give a variety of molded products.

A typical reactive extrusion process to produce starch-vegetable oil graft copolymer in the presence of a plasticizer during free radical initiators is described hereafter. 800 gm of regular corn-starch was pre-blended with 20 gm corn oil in a kitchen blender for 15 minutes. Meanwhile, 200 gm of glycerol was mixed with 1.6 gm 2,5-bis(tert-butylperoxy)-2,5-dimethylhexane (LUPEROX 101) in a glass beaker. The pre-blended mixture of starch and corn oil was further blended with the glycerol mixture and mixed for around 15 minutes. This combined mixture was fed to the feed port of a twin-screw co-rotating CENTURY extruder (screw diameter 30 mm and L/D ratio 40) (Traverse City, Mich.). Vent port was kept open to remove moisture present. A screw configuration as shown in FIG. 1 was used for the reactive extrusion processing. The processing conditions for the reactive extrusion modification of starch to form starch-vegetable oil graft copolymers are shown in Table 1.

TABLE 1

| ZONE | SET | ACTUAL | ° C. |
|---|---|---|---|
| ZONE 1 | 15 | 56 | ° C. |
| ZONE 2 | 95 | 99 | ° C. |
| ZONE 3 | 125 | 131 | ° C. |
| ZONE 4 | 145 | 147 | ° C. |
| ZONE 5 | 150 | 157 | ° C. |
| ZONE 6 | 155 | 161 | ° C. |
| ZONE 7 | 155 | 155 | ° C. |
| ZONE 8 | 155 | 147 | ° C. |
| ZONE 9 | 150 | 93 | ° C. |
| DIE | 145 | 145 | ° C. |
| MELT TEMP. | | 164 | ° C. |
| MOTOR SPEED | | 120 | RPM |
| TORQUE | | 40-50 | % |
| PRESSURE | | 40-50 | Pisa |
| FEEDER SPEED, CENTURY | | | % |

TABLE 1-continued

| ZONE | SET | ACTUAL | ° C. |
|---|---|---|---|
| FEEDER SPEED, MiNi | | % | |
| FEEDER SPEED, EXT | | % | |

The extruded strand was collected in aluminum pans and air-cooled before being ground to a fine powder. The starch-vegetable oil graft copolymer was stored in an oven at 50° C. to prevent entrainment of moisture.

A typical reactive extrusion process to produce biofiber reinforced starch-vegetable oil graft copolymer on the presence of optional modifiers such as maleic anhydride is described hereafter. The starch-vegetable oil graft copolymer (pre-blended with 1-wt % maleic anhydride) was blended with Solka floc (Cellulose based fiber) in a 70:30 ratio. The mixture was fed to the feed port of a twin-screw co-rotating CENTURY extruder (screw diameter 30 mm and L/D ratio 40). Vent port was kept open to remove moisture present. A screw configuration as shown in FIG. 1 was used for the reactive extrusion processing. The processing conditions for the process are similar to the one described in Table 1. The extruded strand was air cooled before being palletized in line. The biofiber-reinforced composite is stored in an oven at 75° C. to prevent entrainment of moisture.

Alternatively, the above two process steps can be combined into a one-step operation wherein the starch-vegetable oil graft copolymer is made in the first section of the extruder (LD of 20) followed by the downstream addition of the biofiber to produce biofiber reinforced starch-vegetable oil graft copolymer composites. The composite was injection molded to form test dog bone samples.

The Injection Molding conditions are shown in Table 2 for the two step process.

TABLE 2

| ZONE | SET | ACTUAL | UNITS |
|---|---|---|---|
| ZONE 1 | 15 | 38 | ° C. |
| ZONE 2 | 95 | 94 | ° C. |
| ZONE 3 | 145 | 145 | ° C. |
| ZONE 4 | 150 | 148 | ° C. |
| ZONE 5 | 155 | 150 | ° C. |
| ZONE 6 | 155 | 163 | ° C. |
| ZONE 7 | 155 | 158 | ° C. |
| ZONE 8 | 155 | 150 | ° C. |
| ZONE 9 | 150 | 148 | ° C. |
| DIE | 145 | 146 | ° C. |
| MELT TEMP. | | 152 | ° C. |
| MOTOR SPEED | | 150 | RPM |
| TORQUE | | 15-20 | % |
| PRESSURE | | | Pis |
| FEEDER SPEED, CENTURY | | | % |
| FEEDER SPEED, MINI | | | % |
| FEEDER SPEED, EXT | | | % |

Starch-vegetable oil graft copolymer has been manufactured by the extrusion processing of starch with corn oil in the presence of glycerol as a plasticizer using LUPEROX 101 as a free radical initiator. Basic characterizations such as thermal analysis, Fourier Transformed Infra Red Spectroscopy (FTIR) have been completed. Biofiber reinforced starch-vegetable oil graft copolymer have been manufactured by reactive extrusion processing as explained above in both a single step as well as a dual step process. The biofiber composite has been injection molded to form dog bone test sample bars. Mechanical properties have been determined.

The effect of changing parameters such as corn oil concentration, type of oil, plasticizer type and concentration, temperature and pressure profiles, etc. on the reactivity and processing of starch-vegetable oil graft copolymers can easily be determined. Further changing the biofiber type or the biofiber addition content and comparing the processing and mechanical properties of the composite with commodity plastics starting from a molding composition is easily within the skill of the art. Finally, the reactive extrusion processing of biofiber reinforced starch-vegetable oil graft copolymers can be extended to an industrial scale-up for the manufacture of biodegradable articles for applications such as biodegradable forks, knives, spoons, golf tees and the like.

The following experimental Examples specifically demonstrate the utility of the present invention for forming biodegradable products containing starch, vegetable oil, plasticizer, initiator fiber and biodegradable polyester.

Examples of materials made in accordance with the present invention in compost experiments confirm biodegradability.

EXAMPLES

Example 1

Figure 2:
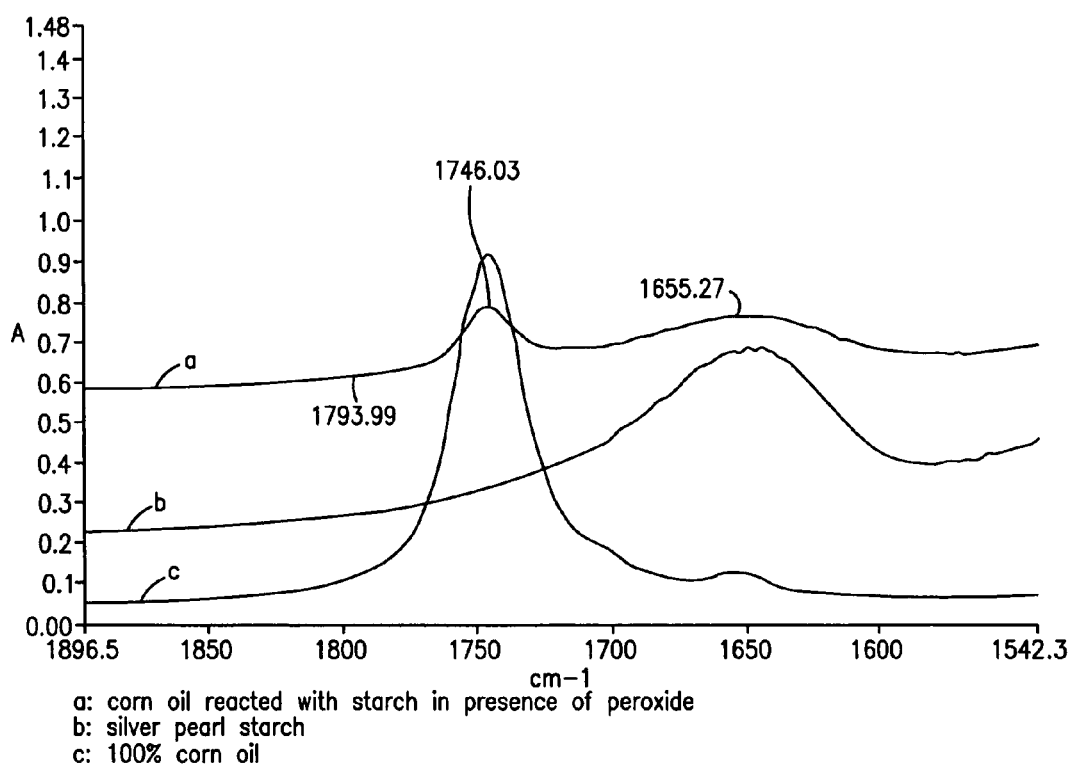
FIG. 2 shows the FTIR scan of extracted product confirming reactivity between starch and corn oil in the synthesis of starch-corn oil graft copolymers. FTIR scans for pure starch and corn oil are also shown as a comparison.

A starch modification reaction was carried out as follows:
740 gm of granular corn-starch (Corn Products, Inc.) was mixed with 71.5 gm of corn oil (Corn Products, Inc.). Further, 185.3 gm glycerol was mixed with 3.2 gm of 2,5-Bis (tert-butylperoxy)-2,5-dimethylhexane (LUPEROX 101 (Aldrich). The two mixtures were mixed in a blender for 15 minutes and extruded using a CENTURY twin-screw co-rotating extruder with a screw diameter of 30 mm and a L/D of 40. The temperature profile and the extrusion processing conditions are shown in Table 1. Screw configuration consisting of both conveying and kneading elements was used and is shown in FIG. 1. D.S.=(162*W)/(100*M−(M−1)*W), where 162 represents the molecular weight of one anhydroglucose unit, W is the weight % of the substituent and M the molecular weight of the substituent. In our case, W=7.18 and M=870 g/mol. This translates to a theoretical D.S. value of 0.014 (i.e. one mol of corn oil per 100 glucose units). The starch-corn oil graft copolymer was extracted for 24 hours in a Soxhlet apparatus using Dichloromethane solvent. Corn oil reacted was found to be 60%. FTIR scan confirming reactivity is shown in FIG. 2.

Example 2

A starch modification reaction following the procedure as explained in Example 1 was carried out as follows:
740 gm of granular corn-starch (Corn Products, Inc.) was mixed with 71.5 gm of maleated corn oil (1 mole of maleated corn oil contains one mole of maleic anhydride). Further, 185.3 gm glycerol was mixed with 3.2 gm of 2,5-Bis(tert-butylperoxy)-2,5-dimethylhexane (LUPEROX 101 (Aldrich). The two mixtures were mixed in a blender for 15 minutes and extruded using a CENTURY twin-screw co-rotating extruder with a screw diameter of 30 mm and a L/D of 40. The temperature profile and the extrusion processing conditions are shown in Table 1. Screw configuration consisting of both conveying and kneading elements was used and is shown in FIG. 1. D.S.=(162*W)/(100*M−(M−1)*W), where 162 represents the molecular weight of one anhydroglucose unit, W is the weight % of the substituent and M the molecular weight of the substituent. In this case, W=7.18 and M=968 (870 of CO+98 of MA). This translates to a theoretical D.S. value of 0.012 (i.e. one mol of corn oil per 100 glucose units). The starch-corn oil graft copolymer was extracted for 24 hours in a Soxhlet apparatus using Dichloromethane solvent. Maleated Corn oil reacted was found to be 52%.

Example 3

Figure 3:
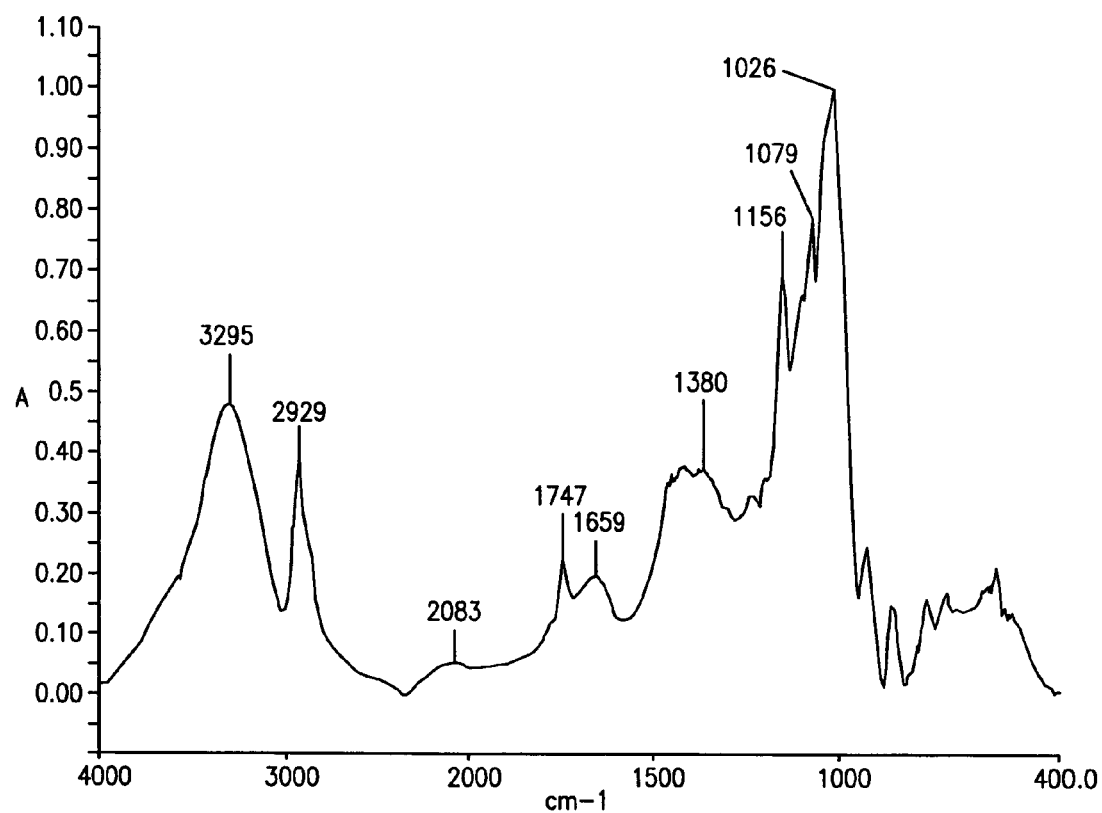
FIG. 3 shows the FTIR scan of extracted product confirming reactivity between starch and maleated corn oil in the synthesis of starch-corn oil graft copolymers (absence of free-radical initiator).

A starch modification reaction following the procedure as explained in Example 1 was carried out as follows:

740 gm of granular corn-starch (Corn Products, Inc.) was mixed with 74.7 gm of maleated corn oil (1 mole of maleated corn oil contains one mole of maleic anhydride). Further, 185.3 gm glycerol was added and the mixture was kneaded in a kitchen blender for 15 minutes and extruded using a CENTURY twin-screw co-rotating extruder with a screw diameter of 30 mm and a L/D of 40. The temperature profile and the extrusion processing conditions are shown in Table 1. Screw configuration consisting of both conveying and kneading elements was used and is shown in FIG. 1. D.S.−(162*W)/(100*M−(M−1)*W), where 162 represents the molecular weight of one anhydroglucose unit, W is the weight % of the substituent and M the molecular weight of the substituent. In this case, W=7.18 and M=968 (870 of CO+98 of MA). This translates to a theoretical D.S. value of 0.012 (i.e. one mol of corn oil per 100 glucose units). The starch-corn oil graft copolymer was extracted for 24 hours in a Soxhlet apparatus using Dichloromethane solvent. Maleated Corn oil reacted was found to be 58%. FTIR scan confirmed reactivity even in the absence of Luperox 101 is shown in FIG. 3.

Example 4

Figure 4:
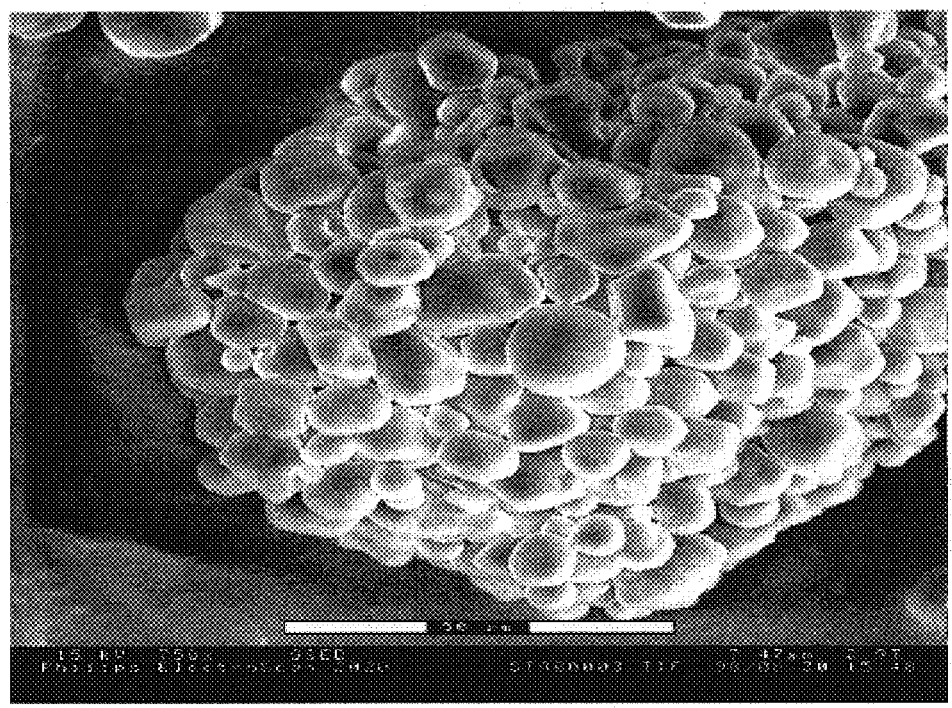
FIG. 4 shows the ESEM (scanning electron microscope) image of regular corn starch.
Figure 5:
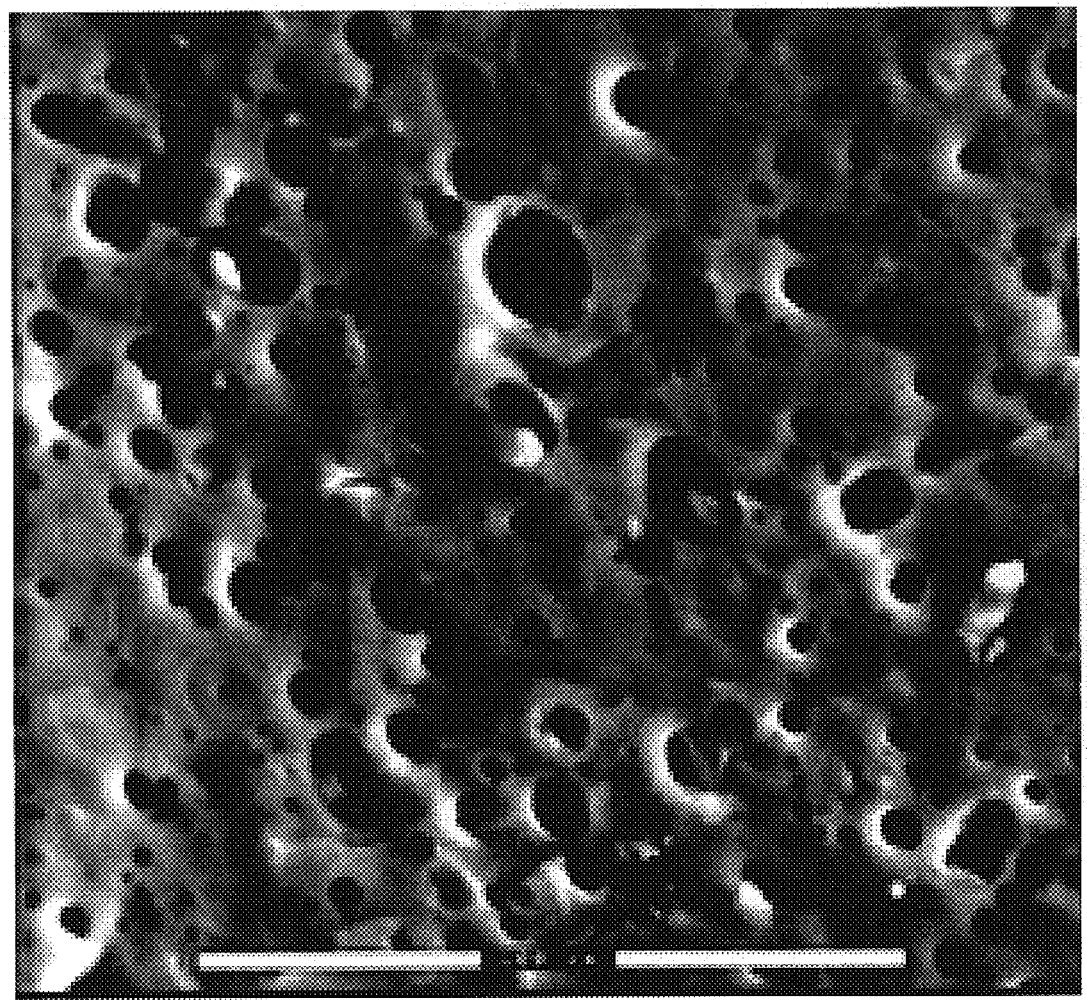
FIG. 5 shows the ESEM image of starch-maleated corn oil graft copolymer produced by reactive extrusion processing.

A starch modification reaction following the procedure as explained in Example 1 was carried out as follows:

770 gm of granular corn-starch (Corn Products, Inc.) was mixed with 35 gm of maleated corn oil (1 mole of maleated corn oil contains one mole of maleic anhydride). Further 185.3 gm glycerol was added and the mixture was kneaded in a kitchen blender for 15 minutes and extruded using a CENTURY twin-screw co-rotating extruder with a screw diameter of 30 mm and a LD of 40. The temperature profile and the extrusion processing conditions are shown in Table 1. Screw configuration consisting of both conveying and kneading elements was used and is shown in FIG. 1. D.S.−162*W)/(100*M−(M−1)*W), where 162 represents the molecular weight of one anhydroglucose unit, W is the weight % of the substituent and M the molecular weight of the substituent. In this case, W=7.18 and M=968 (870 of CO+98 of MA). This translates to a theoretical D.S. value of 0.006 (i.e. one mol of corn oil per 100 glucose units). The starch-corn oil graft copolymer was extracted for 24 hours in a Soxhlet apparatus using Dichloromethane solvent. Maleated Corn oil reacted was found to be 82%. ESEM images of pure starch and starch-vegetable oil graft copolymer are shown in FIGS. 4 and 5 respectively.

Example 5

Figure 6:
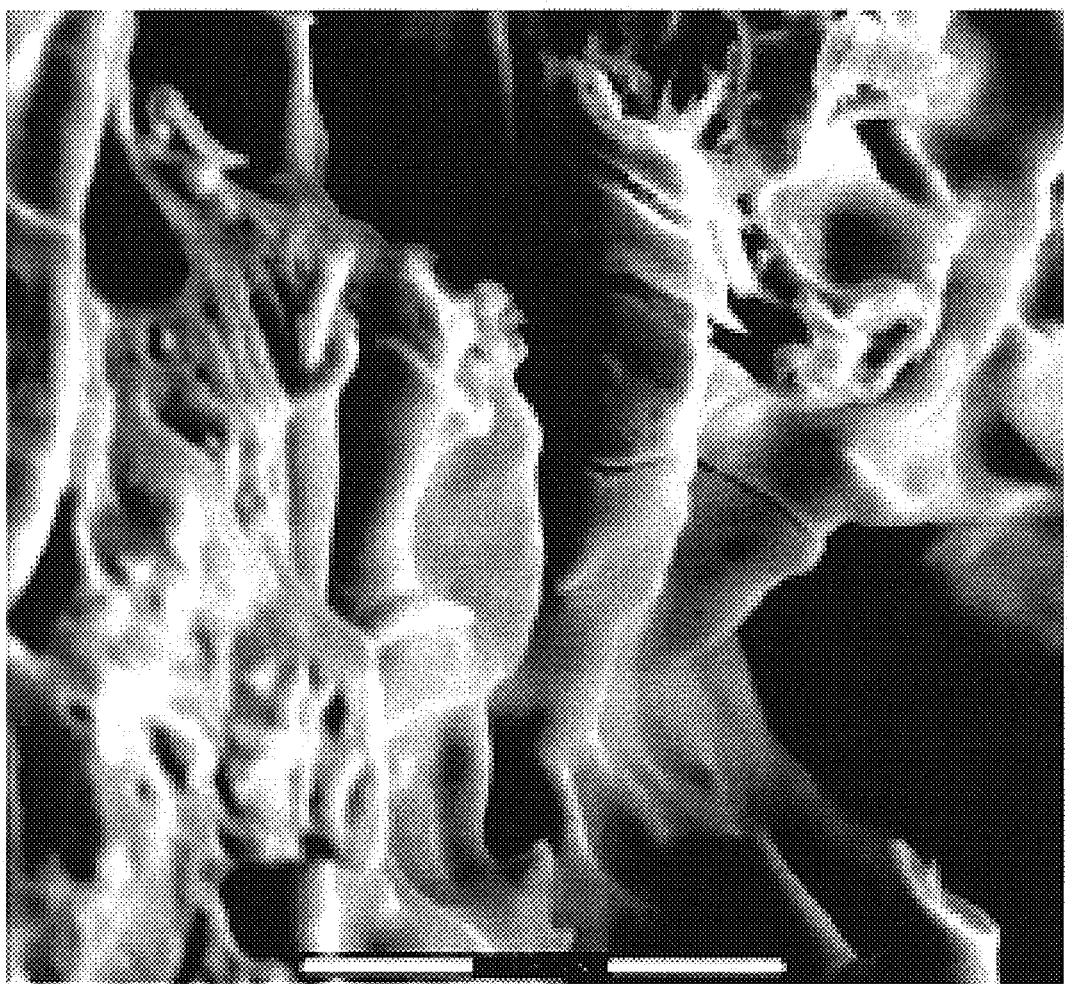
FIG. 6 depicts the ESEM image of fiber reinforced starch-vegetable oil graft copolymer.

A one-step fiber reinforced starch-vegetable oil graft copolymer reaction was carried out as follows:

525 gm of granular corn-starch (Corn Products, Inc.) was first mixed with 15.7 gm maleic anhydride (Aldrich Chemical Company) and further mixed with 56 gm of maleated corn oil (1 mole of maleated corn oil contains one mole of maleic anhydride). Further, 175 gm glycerol mixed with 1.05 gm Luperox 101, was added, and the mixture was kneaded in a kitchen blender for 15 minutes. To this mixture was added 300 gm Kayocell (wood fiber) and further kneaded for 15 minutes. This mixture was extruded using CENTURY twin-screw co-rotating extruder with a screw diameter of 30 mm and a L/D of 40. The temperature profile and the extrusion processing conditions are shown in Table 2. The vent port was kept open to remove unreacted maleic acid and water. Screw configuration consisting of both conveying and kneading elements was used and is shown in FIG. 1. The extruded strand was palletized and stored in an oven at 100° C. The ESEM image of the blend shows good adhesion between the starch and the fiber and is shown in FIG. 6. Injection molding conditions are shown in Table 3.

TABLE 3

Injection molding processing conditions in the synthesis of dog bone samples of fiber reinforced starch-vegetable oil graft copolymers. Temperature profile: (All temperatures are in ° F.

| Nozzle | Zone 1 | Zone 2 | Zone 3 |
|---|---|---|---|
| 380 | 370 | 360 | 340 |
| 380 | 372 | 364 | 341 |

| | |
|---|---|
| Oil temperature: | 104° F. |
| Feed throat temperature: | 120° F. |
| Hold pressure: | 800 psi |
| Pack pressure: | 1400 psi |
| Timer conditions: | |
| Inject high: | 10 sec |
| Pack: | 3 sec |
| Hold: | 3 sec |
| Cooling: | 45 sec |
| Extruder delay: | 16 sec |
| Open dwell: | 1 sec |
| Shot size: | 1 in |
| Shot velocity: | 0.3 in/s |
| Cushion: | 0.25 in |
| Transfer position: | 0.5 in |
| Mold temperature: | 125° F. |

Figure 8:
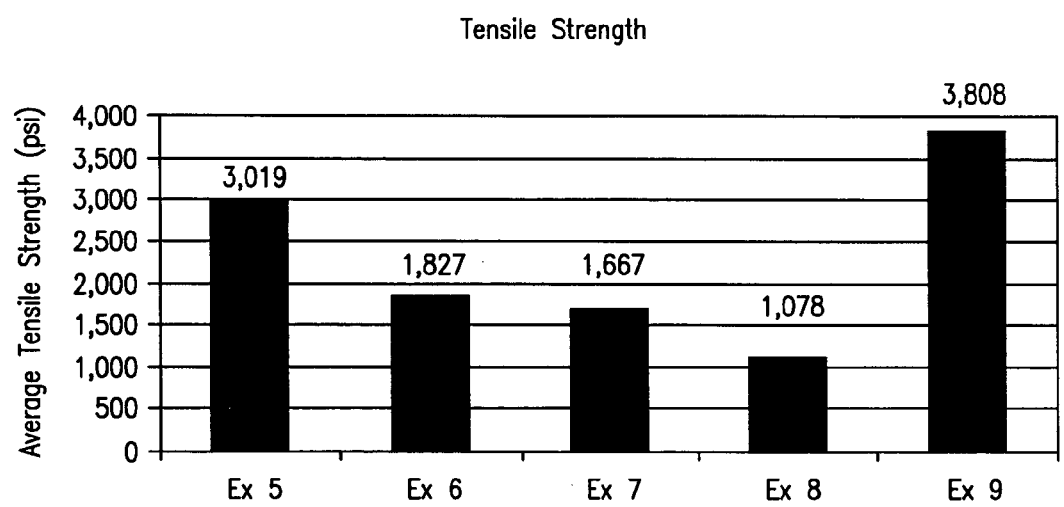
FIG. 8 is a bar graph showing the tensile strength properties of various fiber reinforced starch-vegetable oil graft copolymer blends as explained in Examples 5-9.
Figure 9:
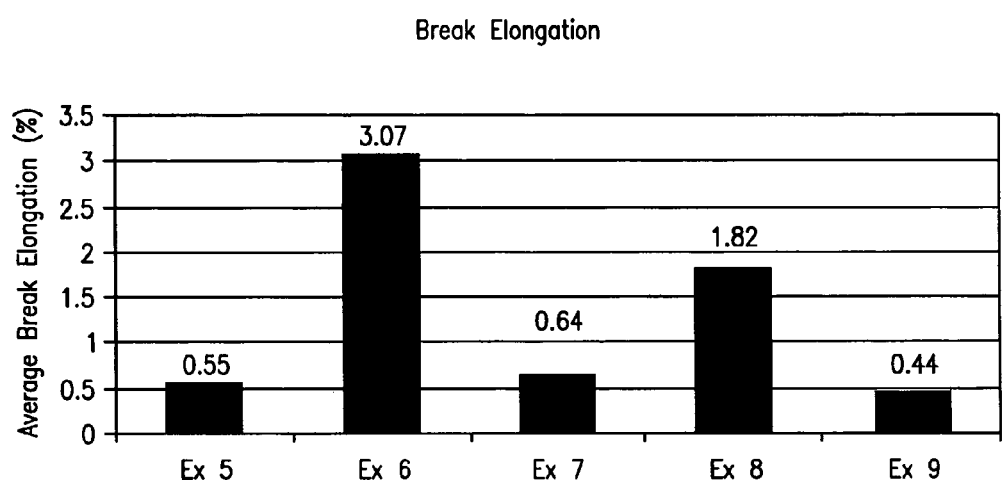
FIG. 9 is a bar graph showing the break elongation properties of various fiber reinforced starch-vegetable oil graft copolymer blends as explained in Examples 5-9.

Tensile properties of the injection molded articles were determined using INSTRON Mechanical Testing Equipment fitted with a 1000 lbs load cell. The crosshead speed was 1 inch per minute. The samples were conditioned at 23° C. and 50% Relative Humidity for 40 hours before being tested according to ASTM D-882 testing. Tensile properties are depicted in FIG. 8 and FIG. 9.

Example 6

Figure 7:
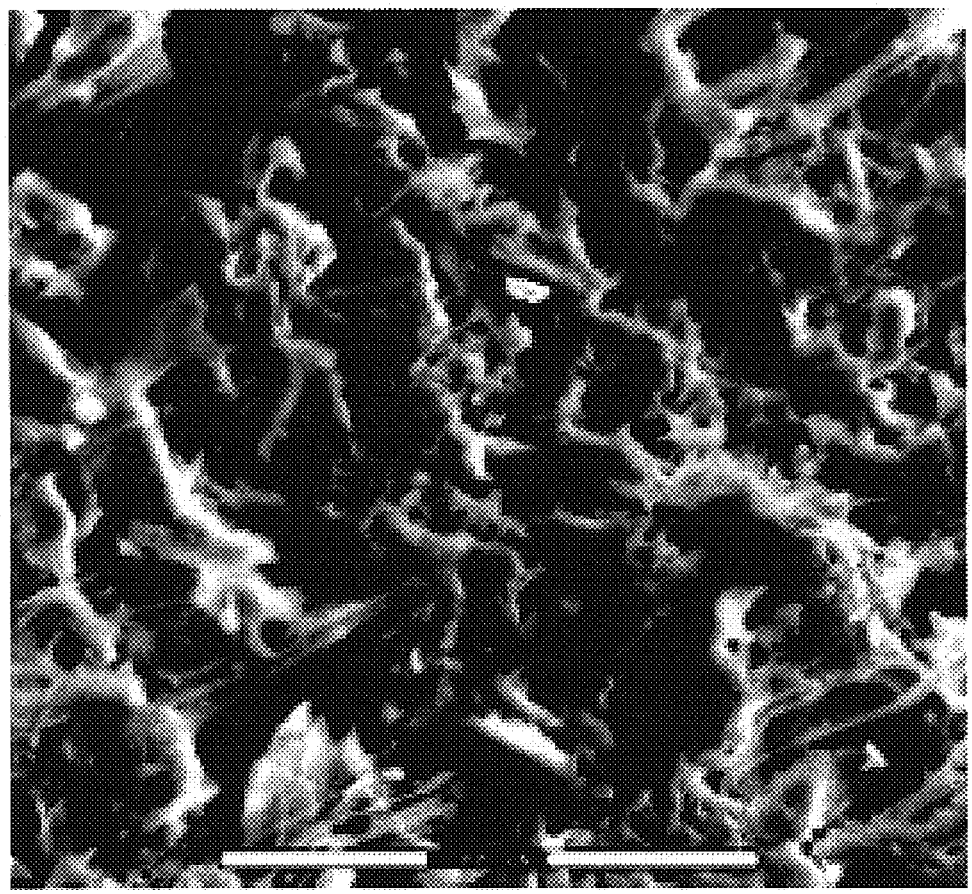
FIG. 7 shows the ESEM image of fiber reinforced starch-vegetable oil graft copolymers containing polycaprolactone polyester.

A one-step fiber reinforced starch-vegetable oil graft copolymer reaction was carried out as follows:

400 gm of granular corn-starch (Corn Products, Inc.) was first mixed with 12 gm maleic anhydride (Aldrich Chemical Company) and further mixed with 56 gm of maleated corn oil (1 mole of maleated corn oil contains one mole of maleic anhydride). Further, 100 gm glycerol mixed with 0.8 gm Luperox 101, was added, and the mixture was kneaded in a kitchen blender for 15 minutes. To this mixture was added 300 gm Kayocell (wood fiber) and 200 gm linear Polycaprolactone polymer (Dow Chemical (Midland, Mich.), TONE 787) and further kneaded for 15 minutes. This mixture was extruded using a CENTURY twin-screw co-rotating extruder with a screw diameter of 30 mm and a L/D of 40. The temperature profile and the extrusion processing conditions are shown in Table 2. The vent port was kept open to remove unreacted maleic acid and water. Screw configuration consisting of both conveying and kneading elements was used and is shown in FIG. 1. The extruded strand was palletized and stored in an oven at 100° C. The ESEM image of the blend is shown in FIG. 7. Injection molding conditions are shown in Table 4.

TABLE 4

Injection molding processing conditions in the synthesis of dog bone samples of fiber reinforced starch-vegetable oil graft copolymers containing polyester or modified polyester. Temperature profile: (All temperatures are in ° F.)

| Nozzle | Zone 1 | Zone 2 | Zone 3 |
|---|---|---|---|
| 370 | 360 | 350 | 340 |
| 369 | 359 | 353 | 341 |

| | |
|---|---|
| Oil temperature: | 110° F. |
| Feed throat temperature: | 126° F. |
| Hold pressure: | 900 psi |
| Pack pressure: | 1300 psi |
| Timer conditions: | |
| Inject high: | 10 sec |
| Pack: | 3 sec |
| Hold: | 2 sec |
| Cooling: | 70 sec |
| Extruder delay: | 16 sec |
| Open dwell: | 1 sec |
| Shot size: | 1.05 in |
| Shot velocity: | 1.25 in/s |
| Cushion: | 0.25 in |
| Transfer position: | 0.5 in |
| Mold temperature: | 70° F. |

Tensile properties of the injection molded articles were determined using INSTRON Mechanical Testing Equipment fitted with a 1000 lbs load cell. The crosshead speed was 1 inch per minute. The samples were conditioned at 23° C. and 50% Relative Humidity for 40 hours before being tested according to ASTM D-882 testing. Tensile properties are depicted in FIG. 8 and FIG. 9.

Example 7

A one-step fiber reinforced starch-vegetable oil graft copolymer reaction was carried out as follows:

400 gm of granular corn-starch (Corn Products, Inc.) was first mixed with 12 gm maleic anhydride (Aldrich Chemical Company) and further mixed with 56 gm of maleated corn oil (1 mole of maleated corn oil contains one mole of maleic anhydride). Further 100 gm glycerol mixed with 0.8 gm LUPEROX 101, was added, and the mixture was kneaded in a blender for 15 minutes. To this mixture was added 300 gm Kayocell (wood fiber) and 200 gm Eastman Polyester (EPE) (Poly butylenes (adipate-co-terephthalate) obtained from Eastman Chemicals) and further kneaded for 15 minutes. This mixture was extruded using a CENTURY twin-screw co-rotating extruder with a screw diameter of 30 mm and a L/D of 40. The temperature profile and the extrusion processing conditions are shown in Table 2. The vent port was kept open to remove unreacted maleic acid and water. Screw configuration consisting of both conveying and kneading elements was used and is shown in FIG. 1. The extruded strand was pelletized and stored in an oven at 100° C. Injection molding conditions are shown in Table 4. Tensile properties of the injection molded articles were determined using INSTRON Mechanical Testing Equipment fitted with a 1000 lbs load cell. The cross head speed was 1 inch per minute. The samples were conditions at 23° C. and 50% Relative Humidity for 40 hours before being tested according to ASTM D-882 testing. Tensile properties are depicted in FIG. 8 and FIG. 9.

Example 8

A one-step fiber reinforced starch-vegetable oil graft copolymer reaction was carried out as follows:

400 gm of granular corn-starch (Corn Products, Inc.) was first mixed with 12 gm maleic anhydride (Aldrich Chemical Company) and further mixed with 56 gm of maleated corn oil (1 mole of maleated corn oil contains one mole of maleic anhydride). Further, 100 gm glycerol mixed with 0.8 gm LUPEROX 101, was added, and the mixture was kneaded in a kitchen blender for 15 minutes. To this mixture was added 300 gm Kayocell (wood fiber) and 400 gm linear Polycaprolactone polymer (Dow Chemical, TONE 787) obtained from Eastman Chemicals; Rochester, N.Y.) and further kneaded for 15 minutes. This mixture was extruded using a CENTURY twin-screw co-rotating extruder with a screw diameter of 30 mm and a L/D of 40. The temperature profile and the extrusion processing conditions are shown in Table 2. The vent port was kept open to remove unreacted maleic acid and water. Screw configuration consisting of both conveying and kneading elements was used and is shown in FIG. 1. The extruded strand was palletized and stored in an oven at 100° C. Injection molding conditions are shown in Table 4. Tensile properties of the injection molded articles were determined using INSTRON Mechanical Testing Equipment fitted with a 1000 lbs load cell. The cross head speed was 1 inch per minute. The samples were conditioned at 23° C. and 50% Relative Humidity for 40 hours before being tested according to ASTM D-882 testing. Tensile properties are depicted in FIG. 8 and FIG. 9.

Example 9

A one-step fiber reinforced starch-vegetable oil graft copolymer reaction was carried out as follows:

1810 gm of granular corn-starch (Corn Products, Inc.) was first mixed with 54.3 gm maleic anhydride (Aldrich Chemical Company) and further mixed with 127 gm of maleated corn oil (1 mole of maleated corn oil contains one mole of maleic anhydride). Further, 603 gm glycerol mixed with 3.62 gm LUPEROX 101, was added, and the mixture was kneaded in a kitchen blender for 15 minutes. To this mixture was added 1088 gm SOLKA FLOX (Cellulose fiber, obtained from International Fiber Corporation) and further kneaded for 16 minutes. This mixture was extruded using a CENTURY twin-screw co-rotating extruder with a screw diameter of 30 mm and a L/D of 40. The temperature profile and the extrusion processing conditions are shown in Table 2. The vent port was kept open to remove unreacted maleic acid and water. Screw configuration consisting of both conveying and kneading elements was used and is shown in FIG. 1. The extruded strand was palletized and stored in an oven at 100° C. Injection molding conditions are shown in Table 5.

TABLE 5

Injection molding processing conditions in the synthesis of dog bone samples of cellulose fiber (SOLKA FLOC) reinforced starch-vegetable oil graft copolymers. Temperature profile: (All temperatures are in ° F.)

| Nozzle | Zone 1 | Zone 2 | Zone 3 |
|---|---|---|---|
| 380 | 370 | 360 | 340 |
| 376 | 373 | 366 | 341 |

| | |
|---|---|
| Oil temperature: | 110° F. |
| Feed throat temperature: | 126° F. |

TABLE 5-continued

Injection molding processing conditions in the synthesis of dog bone samples of cellulose fiber (SOLKA FLOC) reinforced starch-vegetable oil graft copolymers.
Temperature profile: (All temperatures are in ° F.)

| | |
|---|---|
| Hold pressure: | 800 psi |
| Pack pressure: | 1400 psi |
| Timer conditions: | |
| Inject high: | 10 sec |
| Pack: | 3 sec |
| Hold: | 3 sec |
| Cooling: | 45 sec |
| Extruder delay: | 16 sec |
| Open dwell: | 2 sec |
| Shot size: | 1 in |
| Shot velocity: | 0.7 in/s |
| Cushion: | 0.25 in |
| Transfer position: | 0.5 in |
| Mold temperature: | 130° F. |

Tensile properties of the injection molded articles were determined using INSTRON Mechanical Testing Equipment fitted with a 1000 lbs load cell. The crosshead speed was 1 inch per minute. The samples were conditioned at 23° C. and 50% Relative Humidity for 40 hours before being tested according to ASTM D-882 testing. Tensile properties are depicted in FIG. 8 and FIG. 9.

The above examples demonstrate that the present invention provides new starch-vegetable oil based graft copolymers and their fiber reinforced composites which utilize agricultural resources that is biobased and biodegradable. The polymeric materials made in accordance with the present invention is sustainable and environmentally compatible, this being achieved by designing and engineering fully biodegradable materials that are thermoplastic, yet breakdown under appropriate environmental conditions in a manner similar to their lignocellulosic counterparts.

It is intended that the foregoing description be only illustrative of the present invention and that the present invention be limited only by the hereinafter appended claims.

We claim:

1. A biodegradable starch-vegetable oil thermoplastic graft copolymer composition, the composition comprising:
a reactively blended mixture comprising (a) a granular starch, (b) an oil selected from the group consisting of a vegetable oil, a maleated vegetable oil, a hydroxylated vegetable oil, and combinations thereof, (c) a hydroxylated plasticizer, and (d) a free-radical peroxide initiator;
wherein the copolymer resulting from the reactively blended mixture has a graft structure in which the oil is grafted onto the starch.

2. The composition of claim 1 wherein the granular starch is selected from the group consisting of cornstarch, potato starch, tapioca starch, rice starch, wheat starch, cassava starch and high-amylose corn starch.

3. The composition of claim 1 wherein the starch in the mixture is 5% to 90% by weight of the composition.

4. The composition of claim 1 wherein the starch has a moisture content of about 0.5% to 15% by weight of the starch.

5. The composition of claim 1 wherein the starch is in a pulverized form.

6. The composition of claim 1 wherein the starch comprises a chemically modified starch derivative selected from the group consisting of esterified starches, etherified starches, cationic starches, oxidized starches, crosslinked starches, enzymatically converted starches, phosphate-reacted starches, and combinations thereof.

7. The composition of claim 1 wherein the oil is selected from the group consisting of corn oil, maleated corn oil, soybean oil, maleated soybean oil, and mixtures thereof.

8. The composition of claim 1 wherein the oil is 1% to 10% by weight of the composition.

9. The composition of claim 1 wherein the plasticizer comprises a polyhydric alcohol in an amount of 10% to 40% by weight of the composition.

10. The composition of claim 1 wherein the free-radical initiator comprises 2,5-Bis(tert-butylperoxy)-2,5-dimethylhexane.

11. The composition of claim 1 wherein the free-radical peroxide initiator is about 0.01% to 3% by weight of the composition.

12. The composition of claim 1 further comprising a fiber.

13. The composition of claim 12 wherein the fiber is selected from the group consisting of cotton, wood, flax, abaca, sisal, ramie, hemp, and bagasse.

14. The composition of claim 13 wherein the fiber has an aspect ratio of at least about 10:1.

15. The composition of claim 12 wherein the fiber is present in an amount of about 3% to 80% by weight of the composition.

16. The composition of claim 1 further comprising a reactive modifier selected from the group consisting of cyclic or dibasic acids and anhydrides thereof.

17. The composition of claim 16 wherein the reactive modifier is present in the composition in amount of about 0.1% to about 10% by weight of the starch.

18. The composition of claim 1 further comprising a biodegradable polyester selected from the group consisting of poly(caprolactone)(PCL), poly(vinylacetate-co-vinylalcohol)(PVAc/VA), poly(lactic acid) or polylactide (PLA), poly(glycolic acid) or polyglycolide (PGA), poly(beta-hydroxyalkanoates)(PHA), and aliphatic aromatic copolyesters.

19. The composition of claim 18 wherein the biodegradable polyester is 1% to 60% by weight of the composition.

20. The composition of claim 1 wherein the thermoplastic graft copolymer has a degree of substitution of oil grafted onto starch ranging from 0.001 to 1.

21. The composition of claim 1 wherein the thermoplastic graft copolymer has a degree of substitution of oil grafted onto starch ranging from 0.01 to 0.05.

22. A process for producing a biodegradable starch-vegetable oil thermoplastic graft copolymer composition, the process comprising:
(a) reactively blending a mixture of (i) a granular starch, (ii) an oil selected from the group consisting of a vegetable oil, a maleated vegetable oil, a hydroxylated vegetable oil, and combinations thereof, (iii) a plasticizer in a reactor, and (iv) a free-radical peroxide initiator; and
(b) removing the reactively blended mixture from the reactor to produce the thermoplastic graft copolymer composition, wherein the produced copolymer has a graft structure in which the oil is grafted onto the starch.

23. The process of claim 22 wherein the reactor is an extruder.

24. The process of claim 22 wherein the mixture further comprises a fiber.

25. The process of claim 22 wherein the plasticizer comprises a polyhydric alcohol 26. A process for producing a biodegradable starch-vegetable oil thermoplastic graft copolymer composition, the process comprising:

(a) reactively blending a mixture of (i) a granular starch, (ii) an oil comprising a maleated vegetable oil, and (iii) a plasticizer in a reactor; and (b) removing the reactively blended mixture from the reactor to produce the thermoplastic graft copolymer composition, wherein the produced copolymer has a graft structure in which the oil is grafted onto the starch.

27. The process of claim 26 wherein the reactor is an extruder.

28. The process of claim 26 wherein the mixture further comprises a fiber.

29. The process of claim 26 wherein the plasticizer comprises a polyhydric alcohol.

30. The process of claim 26 wherein the reactively blended mixture in step (a) further comprises (iv) a free-radical peroxide initiator.

31. A biodegradable starch-vegetable oil thermoplastic graft copolymer composition, the composition comprising:
a reactively blended mixture comprising (a) a granular starch, (b) an oil selected from the group consisting of a vegetable oil, a maleated vegetable oil, a hydroxylated vegetable oil, and combinations thereof, (c) a hydroxylated plasticizer, and (d) a reactive modifier selected from the group consisting of cyclic or dibasic acids and anhydrides thereof;
wherein the copolymer resulting from the reactively blended mixture has a graft structure in which the oil is grafted onto the starch.

32. The composition of claim 31 wherein the granular starch is selected from the group consisting of cornstarch, potato starch, tapioca starch, rice starch, wheat starch, cassava starch and high-amylose corn starch.

33. The composition of claim 31 wherein the starch in the mixture is 5% to 90% by weight of the composition.

34. The composition of claim 31 wherein the starch has a moisture content of about 0.5% to 15% by weight of the starch.

35. The composition of claim 31 wherein the starch is in a pulverized form.

36. The composition of claim 31 wherein the starch comprises a chemically modified starch derivative selected from the group consisting of esterified starches, etherified starches, cationic starches, oxidized starches, crosslinked starches, enzymatically converted starches, phosphate-reacted starches, and combinations thereof.

37. The composition of claim 31 wherein the oil is selected from the group consisting of corn oil, maleated corn oil, soybean oil, maleated soybean oil, and mixtures thereof.

38. The composition of claim 31 wherein the oil is 1% to 10% by weight of the composition.

39. The composition of claim 31 wherein the plasticizer comprises a polyhydric alcohol in an amount of 10% to 40% by weight of the composition.

40. The composition of claim 31 wherein the reactively blended mixture further comprises (e) a free-radical peroxide initiator comprising 2,5-Bis (tert-butylperoxy)-2, 5-dimethylhexane.

41. The composition of claim 40 wherein the free-radical peroxide initiator is about 0.01% to 3% by weight of the composition.

42. The composition of claim 31 further comprising a fiber.

43. The composition of claim 42 wherein the fiber is selected from the group consisting of cotton, wood, flax, abaca, sisal, ramie, hemp, and bagasse.

44. The composition of claim 43 wherein the fiber has an aspect ratio of at least about 10:1.

45. The composition of claim 42 wherein the fiber is present in an amount of about 3% to 80% by weight of the composition.

46. The composition of claim 31 wherein the reactive modifier is present in the composition in amount of about 0.1% to about 10% by weight of the starch.

47. The composition of claim 31 further comprising a biodegradable polyester selected from the group consisting of poly(caprolactone)(PCL), poly(vinylacetate-co-vinylalcohol)(PVAcNA), poly(lactic acid) or polylactide (PLA), poly (glycolic acid) or polyglycolide (PGA), poly(beta-hydroxyalkanoates)(PHA), and aliphatic aromatic copolyesters.

48. The composition of claim 47 wherein the biodegradable polyester is 1% to 60% by weight of the composition.

49. The composition of claim 31 wherein the thermoplastic graft copolymer has a degree of substitution of oil grafted onto starch ranging from 0.001 to 1.

50. The composition of claim 31 wherein the thermoplastic graft copolymer has a degree of substitution of oil grafted onto starch ranging from 0.01 to 0.05.

* * * * *

UNITED STATES PATENT AND TRADEMARK OFFICE
CERTIFICATE OF CORRECTION

PATENT NO. : 7,553,919 B2  
APPLICATION NO. : 11/124491  
DATED : June 30, 2009  
INVENTOR(S) : Ramani Narayan, Sunder Balakrishnan and Boo-Young Shin It is certified that error appears in the above-identified patent and that said Letters Patent is hereby corrected as shown below:

Column 18, line 32, Claim 47, "(PVAcNA)" should be --(PVAc/VA)--.

Signed and Sealed this

Twenty-fourth Day of November, 2009

David J. Kappos  
*Director of the United States Patent and Trademark Office*